United States Patent
Brückner et al.

(10) Patent No.: US 6,173,679 B1
(45) Date of Patent: Jan. 16, 2001

(54) WASTE-HEAT STEAM GENERATOR

(75) Inventors: Hermann Brückner, Möhrendorf; Werner Schwarzott, Grossenseebach; Helmut Stierstorfer, Erlangen, all of (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/475,629

(22) Filed: Dec. 30, 1999

Related U.S. Application Data

(63) Continuation of application No. PCT/DE98/01663, filed on Jun. 17, 1998.

(30) Foreign Application Priority Data

Jun. 30, 1997 (DE) .............................. 197 27 721

(51) Int. Cl.[7] .................................................. F22B 33/02
(52) U.S. Cl. ...................... 122/406.4; 122/1 B; 122/1 C; 122/7 R; 122/451 S; 122/460; 122/477
(58) Field of Search .................... 122/1 B, 1 C, 122/7 R, 406.4, 406.5, 451 S, 460, 467, 468, 470, 477, 479.7

(56) References Cited

U.S. PATENT DOCUMENTS

| | | | |
|---|---|---|---|
| 3,250,259 | * 5/1966 | Profos | 122/406.4 |
| 3,769,942 | * 11/1973 | Brehler | 122/479.7 |
| 4,072,182 | * 2/1978 | Cheng | 122/406.4 |
| 4,207,842 | * 6/1980 | Kehlhofer | 122/406.4 |
| 4,465,027 | * 8/1984 | Steinegger | 122/406.4 |
| 5,588,400 | * 12/1996 | Stefan et al. | 122/406.4 |
| 5,762,031 | * 6/1998 | Gurevich | 122/7 R |
| 5,924,389 | * 7/1999 | Palkes et al. | 122/1 B |

* cited by examiner

Primary Examiner—Denise L. Ferensic
Assistant Examiner—Gregory A. Wilson
(74) Attorney, Agent, or Firm—Herbert L. Lerner; Laurence A. Greenberg; Werner H. Stemer

(57) ABSTRACT

For achieving a high plant efficiency, a waste-heat steam generator, in particular for a combined-cycle power plant, has a number of heating surfaces heatable by a flue gas and carrying a medium to be heated. The steam generator can be operated at critical or supercritical pressures and has a once-through evaporator connected in countercurrent to the flue gas provided on a medium side. The evaporator is followed by a preheater and preceded by a superheater on a flue-gas side.

16 Claims, 2 Drawing Sheets

WASTE-HEAT STEAM GENERATOR

CROSS-REFERENCE TO RELATED APPLICATION

This is a continuation of copending International Application PCT/DE98/01663, filed Jun. 17, 1998, which designated the United States.

BACKGROUND OF THE INVENTION

FIELD OF THE INVENTION

The invention relates to a waste-heat steam generator, in particular for a combined-cycle power plant, with a number of heating surfaces heatable by a flue gas and carrying a medium to be heated. More specifically, the generator contains a preheater following an evaporator on the flue gas side and a superheater precedes the evaporator on the flue gas side.

Such a waste-heat steam generator or waste-heat boiler is usually part of a combined-cycle power plant, in which the heat contained in the expanded working medium from the gas turbine is used to generate steam for the steam turbine. The heat is transmitted by a number of heating surfaces which are disposed in the form of tubes or tube bundles in the waste-heat steam generator. These, in turn, are connected into the water/steam circuit of the steam turbine, the circuit containing at least one pressure stage. In this case, each pressure stage usually has, as heating surfaces, a preheater or economizer and a evaporator as well as a superheater. A connection having a first or high-pressure stage and a second or low-pressure stage—a so-called two-pressure process—is known from European Patent EP 0 410 111 B1.

Due to the further development of the stationary gas turbine towards higher unit output and higher efficiency, in conjunction with an increased exhaust-gas temperature at the gas turbine outlet, it can be seen that it would also become necessary to adapt the fresh-steam parameters, namely the fresh-steam temperature and fresh-steam pressure, in order to achieve a further increase in plant efficiency. An increased exhaust-gas temperature of the gas turbine consequently results in an enhancement of the fresh-steam parameters, in order to achieve correspondingly high efficiency of the overall combined-cycle process.

In a waste-heat steam generator of this type, configured as a drum boiler and working on the circulation principle, evaporation is ended by separating the steam from the not yet evaporated water at deflecting plates in the drum. This separation requires circulation. The circulation and the steam separation make it necessary to have, between the water and steam, an appreciable density difference which, in turn, presupposes an appreciable pressure deviation (>50 to 60 bar) from the critical pressure (221 bar). Steam separation thus places an upper limit on the pressure, so that a drum boiler can work only below an operating pressure of 160 to 170 bar. Moreover, high steam pressures necessitate large wall thicknesses of the water/steam separating drum, thus sharply restricting the permissible rate of temperature change in the start-up and load-alternation modes undesirably.

In the forced once-through principle, such as a fossil-fuelled once-through steam generator, as an alternative to the circulation or natural circulation principle, the heating of the evaporator tubes forming a combustion-chamber wall leads to complete evaporation of the flow medium in the evaporator tubes in a single pass. In this forced once-through principle, the end of evaporation and consequently, at the same time, the commencement of steam superheating occur as a function of the load and are not locally fixed. In this case, with a once-through steam generator of this type, a freshsteam pressure above the critical water pressure may be implemented due to the absence of steam separation or water precipitation. A once-through steam generator of this type is known, for example, from European Patent EP 0 595 009 B1.

However, in conjunction with a gas turbine in a so-called combined-cycle power plant, a once-through steam generator of this type is usually not employed as a pure waste-heat steam generator. Instead, the oxygenous exhaust gas from the gas turbine serves merely as combustion air for the firing system of this fossil-fuelled steam generator. Disadvantages of a once-through steam generator of this kind are its high outlay in terms of connection and regulation and its high start-up losses due to so-called water ejection. This occurs when evaporation in the evaporator commences and the steam pushes out the downstream water quantity (water drops). Additional separating and monitoring components, provided in order to overcome the start-up losses caused thereby, additionally increase the technical outlay and consequently the investment costs which increase sharply with a desired implementation of high and very high steam pressures. Another essential disadvantage of the fired once-through steam generator, as compared with the pure waste-heat steam generator, is the comparatively uneven adaptation of the temperature profile of the heated medium (water/water-steam line) to the temperature profile of the heating medium (flue-gas line).

SUMMARY OF THE INVENTION

It is accordingly an object of the invention to provide a waste-heat steam generator which overcomes the above-mentioned disadvantages of the prior art devices of this general type, in which a critical or supercritical steam pressure can also be implemented, while at the same time it operates in a fluidically stable manner in all load ranges, in particular even in the partload range.

With the foregoing and other objects in view there is provided, in accordance with the invention, a waste-heat steam generator, including:

a number of heating surfaces heatable by a flue gas and carrying a medium to be heated, the number of heating surfaces including:
   an evaporator having an inlet side, an outlet side and evaporator tubes;
   a preheater following the evaporator on a flue gas side; and
   a superheater preceding the evaporator on the flue gas side, the preheater, the evaporator and the superheater disposed on a medium side in countercurrent to the flue gas;
an inlet distributor connecting the evaporator on the inlet side to the preheater;
a throttle configuration connecting each of the evaporator tubes to the inlet distributor; and
a pressure-equalizing header in a form of an equalizing tube connected to the evaporator.

Provided for this purpose is a waste-heat steam generator which works on the forced once-through principle and the drum-free evaporator of which is connected, on the medium side, in countercurrent to the direction of flow of the flue gas. The evaporator is connected on the inlet side to the preheater via an inlet distributor that is identical to an outlet header of the preheater. To achieve particularly stable operation of the evaporator, the latter is provided on the inlet side with a throttle configuration, a throttle expediently being connected into the inlet of each individual evaporator tube. Increased pressure loss over a particularly wide load range is thereby achieved in the evaporator. This ensures a uniform flow through the evaporator tubes.

Furthermore, instead of headers and distributors conventionally used, only a pressure-equalizing header is provided between the evaporator portions or evaporator parts. The header subdivides the entire evaporator virtually into two portions on the pressure side, since identical pressures prevail in each case at the ends of the evaporator portions.

This increases the through flow stability, while avoiding a further increase in the pressure losses. Expediently, the pressure-equalizing header has only a relatively thin tube for the connection of a tapping bore of each evaporator tube. The connecting tube of small dimensions influences the flow within the evaporator only insignificantly and therefore does not present any problems with regard to allocating to the evaporator tubes the two-phase mixture of the medium to be heated, the mixture being established in the evaporator.

Expediently, a preheater which follows the evaporator on the flue-gas side and a superheater which precedes the evaporator on the flue-gas side are also configured to be connected in countercurrent on the medium side.

A once-through or forced once-through waste-heat steam generator of this type makes it possible to implement high steam states up to supercritical values, since the generator is not subject to any pressure limitation. Furthermore, short start-up times and high rates of load change can be implemented by avoiding the use of thick-walled drums. This contributes, in turn, to a particularly favorable plant behavior. Moreover, particularly high operational flexibility is achieved, on the one hand since it is possible for the fresh-steam temperature to be set solely by the medium throughput, and on the other hand since a variable medium throughput can be set at least within specific limits.

Published, Non-Prosecuted German Patent Application DE 43 03 613 A1 discloses a forced once-through steam generator having a preheater and evaporator as well as superheater heating surfaces disposed on the medium side in countercurrent to the flue gas. However, there the heating surfaces are connected to one another in a conventional way via outlet and inlet headers. In addition, the evaporator is configured to be divided by interposing both an inlet header and an outlet header. In this case, a portion of the evaporator is bridged by a bypass line during starting up, in order to keep an outsurge of water as small as possible. The desired stable flow conditions in the evaporator with at the same time minimization of the temperature differences between the individual evaporator tubes are not achieved however with this configuration.

In order to implement the once-through principle, the evaporator is connected, on the inlet side, virtually directly to the outlet of the preheater, without a water/steam separating drum being interposed. Connecting the evaporator in this case in countercurrent to the flue gas on the medium side leads advantageously to uniform temperature intervals between the flue-gas line and water/steam line, so that, altogether, a heating surface of a relatively small size is required. Moreover, this countercurrent connection has the advantage of particularly low water ejection when the waste-heat steam generator is started up, since its side which is hot on the flue-gas side and which has appreciable steam-bubble formation is located only at the water-side end of the evaporator. Due to the short distance available for steam bubbles formed, these push only a small water content out of the evaporator.

As regards the thermal configuration of the evaporator, the evaporator is expediently subdivided into two evaporator parts. In this case, the medium-side first evaporator part has no outlet header. Likewise, the second evaporator part located downstream of this has no inlet distributor. At the same time, the number of parallel tubes of both individual heating surfaces or evaporator parts is identical. Moreover, the first evaporator part is expediently composed of tubes having an inside diameter that is small, as compared with the second evaporator part. By virtue of the evaporator configuration, a cost saving is achieved because there is no need for headers. If the pressure loss is preferably at the start of flow and the flue velocity is kept within a preferred range along the entire evaporator, a stable flow is achieved. As a result, particularly good heat transmission from the flue gas to the medium flowing through the evaporator, along with low erosion, is achieved. Furthermore, possible temperature differences between the parallel tubes are kept low owing to a uniform steam-side through flow.

In order to prevent water ejected during the start-up from passing into the superheater, the latter is preceded by a start-up bottle which follows the evaporator. In this case, the evaporator and the superheater are connected to the steam-side head end of the start-up bottle. The preheater and the evaporator are connected on the inlet side to a water-side bottom connection of the start-up bottle. The partial streams conveyed into the evaporator and into the preheater can be set by use of actuating members. Feed water supplied to the preheater can thus be supplemented by the partial stream from the start-up bottle or be at least partially replaced by the partial stream. Also, the water not required for operating the once-through waste-heat steam generator can be discharged in a controlled manner from the start-up bottle. For this purpose, a discharge conduit is provided at the water-side bottom end of the start-up bottle.

The steam supplied to the superheater via the start-up bottle and via an inlet distributor is discharged from the superheater as superheated steam (main steam stream) via an outlet header. In this case, the superheater is preferably composed of two individual heating surfaces which are connected in series on the medium side and, if the once-through waste-heat steam generator is of vertical construction, are disposed one above the other on the flue-gas side, so that two-stage steam superheating takes place.

The advantages afforded by the invention are, in particular, that an especially stable operating mode is achieved over a wide load range due to the evaporator of the waste-heat steam generator being configured as a once-through evaporator with a countercurrent connection. As a result, while at the same time a low water-side/steam-side pressure loss is ensured, the drum-free evaporator is configured with a large surface, in such a way that, in all the operating states, it acts on the once-through principle as a part economizer and evaporator and as a part superheater. The feed water is therefore subcooled at each operating point at the outlet of the preheater or of the economizer heating surface, so that evaporation in the economizer is reliably prevented, since heating to boiling temperature takes place in the evaporator itself, acting as part economizer, the so-called "approach point" is always zero. This results in an evaporator heating surface which is small, as compared with the drum boiler.

A neutral chemical operating mode is also possible, with a result that the chemical consumption is reduced. In addition, on account of the neutral chemical operating mode, there is no need for blow-down when the plant is in operation. A considerable cost reduction is achieved by avoiding the use of water/steam separating drums and connecting pipelines necessary in this case as well as by the possibility of reduced boiler or steam generator dimensions. Stable operation in the once-through mode is ensured within a combined-cycle power plant, in particular even in low part-load ranges of the gas turbine.

Other features which are considered as characteristic for the invention are set forth in the appended claims. Although the invention is illustrated and described herein as embodied in a waste-heat steam generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
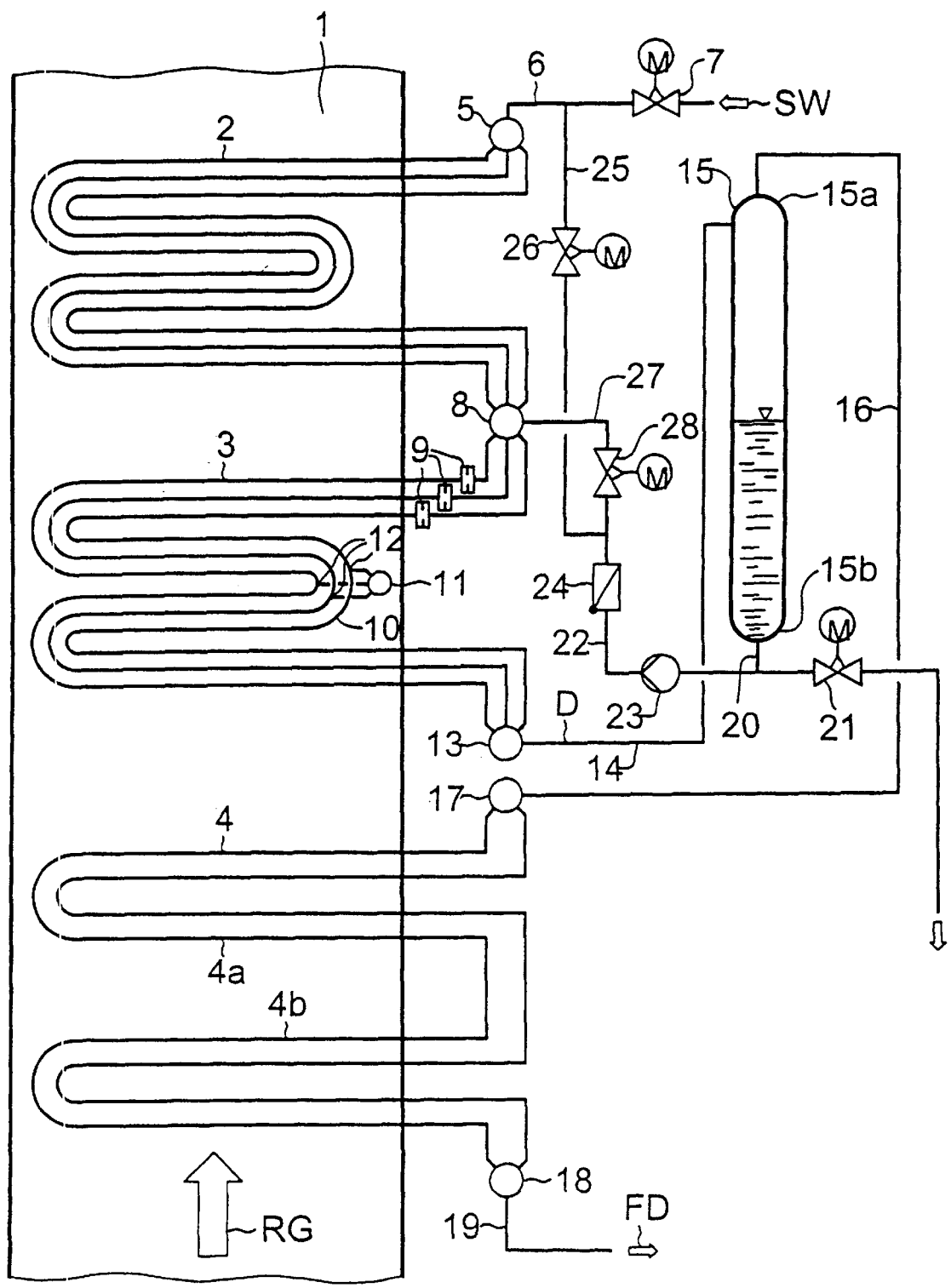
FIG. 1 is a diagrammatic, illustration of a detail of a once-through waste-heat steam generator with heating surfaces connected into a water/steam circuit according to the invention.

In all the figures of the drawing, sub-features and integral parts that correspond to one another bear the same reference symbol in each case. Referring now to the figures of the drawing in detail and first, particularly, to FIG. 1 thereof, there is shown a once-through waste-heat steam generator 1 which is of a vertical configuration. The steam generator 1, is, for example, part of a combined-cycle power plant and receives a hot flue gas RG from the gas turbine flowing through it on the primary side. The cooled flue gas RG leaves the waste-heat steam generator 1 in the direction of a non-illustrated chimney. The waste-heat steam generator 1 contains, as heating surfaces, a preheater or economizer 2, an evaporator 3, as well as a superheater 4 of a pressure stage. The heating surface configuration is used preferably both in a high-pressure part and in a medium-pressure part of the once-through waste-heat steam generator 1.

The preheater 2 has, on an inlet side, an inlet distributor 5 which is common to all the preheater tubes and into which is connected a feed-water conduit 6 having a motor-driven control valve 7. On an outlet side, the tubes of the preheater 2 open into a common outlet header 8 which is at the same time an inlet distributor of the evaporator 3 located downstream of the preheater 2 on a medium side. To achieve stable operation of the evaporator 3, the latter is preceded by a throttle configuration. For this purpose, a throttle 9 is connected into the inlet of each parallel tube of the evaporator 3, with the result that an increased pressure loss is achieved over a wide load range in the evaporator 3. Provided in a region of a deflection 10 of the evaporator 3 is a pressure equalizing header 11 in the form of a relatively thin tube for the connection of a tapping bore 12 of each parallel tube of the evaporator 3. On the outlet side, the parallel tubes of the evaporator 3 open into an outlet header 13 which is connected to a start-up bottle 15 via a steam conduit 14. The connection of the steam conduit 14 is provided at a steam-side head end 15a of the start-up bottle 15, a further steam conduit 16 being connected to the head end. The steam conduit 16 opens into an inlet distributor 17 of the superheater 4. The superheater 4, which is composed of a first part or individual heating surface 4a and of a second part heating surface 4b following the latter on the medium side and preceding it on the flue-gas side, has, on the outlet side, an outlet header 18, to which a main steam conduit 19 is connected.

The start-up bottle 15 has, at its water-side bottom end 15b, a discharge conduit 20 having a motor-driven control valve 21. A branch 22 of the discharge conduit 20 with a circulating pump 23 connected in the branch 22, leads to the feed-water conduit 6 via a control or throttle flap 24 and a motor-driven control valve 26 connected into a first part-stream conduit 25. A second part-stream conduit 27 of the branch 22 leads via a motor-driven control valve 28 to the inlet distributor or outlet header 8. The heating surfaces 2,3 and 4 of the once-through waste-heat steam generator 1 are connected into the water/steam circuit of the steam turbine of the combined-cycle power plant via the feed-water conduit 6 and the main steam conduit 19 in a way not illustrated in any more detail.

Figure 2:
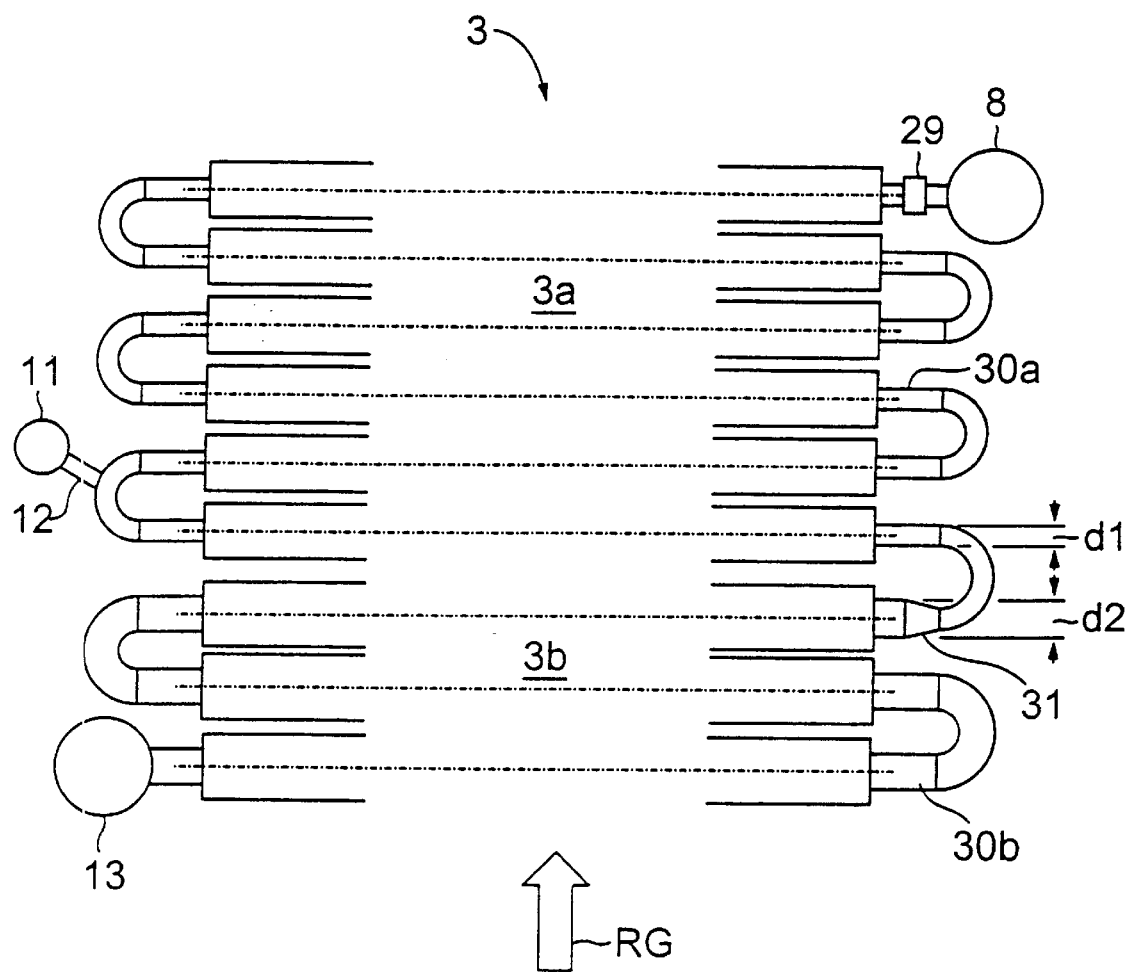
FIG. 2 is an illustration of an evaporator of the waste-heat steam generator according to FIG. 1, the evaporator being composed of two individual heating surfaces.

FIG. 2 shows a preferred embodiment of the evaporator 3 having two individual heating surfaces. These are implemented by a first evaporator part 3a and a second evaporator part 3b following the latter on the medium side and preceding it on the flue-gas side. The inlet distributor 8 is connected to an inlet port 29 of the first evaporator part 3a. Both evaporator parts 3a and 3b are composed in each case of the same number of parallel tubes, only one parallel or evaporator tube 30a or 30b of which can be seen in each case. The pressure-equalizing header 11 is connected to the first evaporator part 3a and only one of the tapping bores 12 being visible.

The two evaporator parts 3a and 3b are connected to one another directly, that is to say without an outlet header or inlet distributor being interposed. In this case, the parallel tubes 30a of the first evaporator part 3a have an inside diameter d1 which is smaller than the inside diameter d2 of the parallel tubes 30b of the second evaporator part 3b (d1<d2). The connection of the individual parallel tubes 30a and 30b of the evaporator parts 3a and 3b is made in each case via a conically configured intermediate piece. This intermediate or connecting piece 31 is configured conically, preferably in the form of a cone frustum, in order to implement the widening in diameter. On the outlet side, the parallel tubes 30b of the second evaporator part 3b are connected to the outlet header 13.

When the once-through waste-heat steam generator 1 is in operation, condensed water, so-called feed water SW, flows out of the condenser (not shown), located downstream of the steam turbine (not shown), via the feed-water conduit 6 and through the preheater 2 into the outlet header 8 or inlet distributor 8. The preheated feed water SW flows from there, via the throttles 9, into the individual evaporator tubes 30a of the first evaporator part 3a of the evaporator 3. In this case, the connection between the preheater 2 and the evaporator 3 is peculiarly short and uncomplicated, while an especially small overall heating surface of the evaporator 3 is achieved at the same time.

The throttles 9 ensure an increased pressure loss in the evaporator 3 virtually over the entire load range of the waste-heat steam generator 1. The flow passes through the evaporator 3, that is to say both the first evaporator part 3a having the evaporator tubes 30a and the second evaporator part 3b having the evaporator tubes 30b, on the medium side or water side in countercurrent to the direction of flow of the flue gas RG. In this case, a stable and uniform flow of the preheated feed water SW through the evaporator tubes 30a, 30b is achieved, while the boiling temperature corresponding to the respective pressure of the flow medium is established in the evaporator tubes 30a, 30b.

With a corresponding throughput rate, steam D generated in the evaporator 3 is slightly superheated, at each operating point, at the outlet of the evaporator 3, that is to say in the outlet header 13 and in the steam conduit 14 connected to it, as a result of the single pass or forced pass. Consequently, no water drops can pass into the downstream superheater 4. Damage to the heating surfaces of the superheater 4 as a result of inadmissible temperature gradients are thereby reliably avoided. By virtue of this configuration and organization of the evaporator 3, the latter can be operated with a sliding evaporation point over a wide load range. The steam D generated in the evaporator 3 can therefore be introduced directly into the superheater 4, the start-up bottle 15 coming into action only when the once-through waste-heat steam generator 1 is started up.

Since, during start-up, the ejection of water from the evaporator 3 is particularly low, it is necessary for the start-up bottle 15 to have only a relatively small dimensioning in order to receive the ejected water. In this case, a relatively small wall thickness of the start-up bottle 15 may be implemented, this being associated with correspondingly short start-up and load-alternation times. In the vertical configuration of the once-through waste-heat steam generator 1, as illustrated, this particularly low water ejection is achieved in that, in particular, in implementation of the countercurrent connection, the flow passes through the evaporator tubes 30a, 30b from the top downwards on the medium side or water side. Evaporation therefore takes place essentially in the lower evaporator tubes 30b of the second evaporator part 3b and decreases in the direction of the upper evaporator tubes 30a of the first evaporator part 3a.

While the steam D already generated during start-up and separated in the start-up bottle 15 is fed, for further superheating, through the superheater 4 and is fed from there, in the superheated state, to the steam turbine (not shown) as main steam or fresh steam FD and, from there, is introduced again as condensate into the water/steam circuit, the water from the start-up bottle 15, virtually extracted from the water/steam circuit only during the start-up, is fed, as required, to the evaporator 3 and/or to the preheater 2. Expediently, however, for reasons of flow stability, the essential fraction of this start-up water from the start-up bottle 15 is admixed, via the first part-stream conduit 25, with the feed water SW before the latter enters the preheater 2. Start-up water not required in the water/steam circuit can be drawn off from the start-up bottle 15 via the discharge conduit 20.

By use of the waste-heat steam generator 1 working on the once-through principle, high steam pressures can be implemented, even in the critical or the supercritical range. For this purpose, the flow passes through both of the evaporator parts 3a and 3b, and consequently the entire evaporator 3, downwards on the medium side, while the flue gas RG has an ascending direction of flow. The once-through waste-heat steam generator 1 achieves, altogether, fluidically especially stable operation down to minimum load on the once-through principle.

We claim:

1. A waste-heat steam generator, comprising:
   a number of heating surfaces heatable by a flue gas and carrying a medium to be heated, said number of heating surfaces including:
      an evaporator having an inlet side, an outlet side and evaporator tubes;
      a preheater following said evaporator on a flue gas side; and
      a superheater preceding said evaporator on the flue gas side, said preheater, said evaporator and said superheater disposed on a medium side in countercurrent to the flue gas;
   an inlet distributor connecting said evaporator on said inlet side to said preheater;
   a throttle configuration connecting each of said evaporator tubes to said inlet distributor; and
   a pressure-equalizing header in a form of an equalizing tube connected to said evaporator.

2. The waste-heat steam generator according to claim 1, wherein each of said evaporator tubes has a tapping bore, and said equalizing tube is connected to said tapping bore of each of said evaporator tubes.

3. The waste-heat steam generator according to claim 1, wherein said evaporator has a deflection region and said pressure-equalizing header is connected to said deflection region of said evaporator.

4. The waste-heat steam generator according to claim 1, wherein said evaporator is composed of a number of evaporator parts, including a first evaporator part and a second evaporator part, connected in series on the medium side.

5. The waste-heat steam generator according to claim 4, wherein said first evaporator part on the medium side is composed of said evaporator tubes having a small inside diameter, as compared with an inside diameter of said evaporator tubes of said second evaporator part, said evaporator tubes of said second evaporator part being disposed downstream of said evaporator tubes of said first evaporator part on the steam side.

6. The waste-heat steam generator according to claim 5, wherein said evaporator has a conically shaped connecting piece and said evaporator tubes of said evaporator parts are connected to one another directly via said conically shaped connecting piece.

7. The waste-heat steam generator according to claim 1, including a start-up bottle, and said evaporator is connected on said outlet side to said superheater via said start-up bottle.

8. The waste-heat steam generator according to claim 7, including a circulating pump having a downstream control valve, said start-up bottle has a water side and is connected on said water side to said preheater via said circulating pump having said downstream control valve.

9. The waste-heat steam generator according to claim 7, including a circulating pump having a downstream control valve, said start-up bottle has a water side and is connected on said water side to said evaporator via said circulating pump having said downstream control valve.

10. The waste-heat steam generator according to claim 8, including a throttle flap disposed downstream of said circulating pump.

11. The waste-heat steam generator according to claim 8, including:
   a discharge conduit connected on said water side to said start-up bottle; and
   a control valve disposed along said discharge conduit.

12. The waste-heat steam generator according to claim 1, including a control valve and a feed-water conduit connected to said control valve, said preheater has an inlet side connected to said feed-water conduit.

13. The waste-heat steam generator according to claim 1, wherein said superheater has an inlet distributor and an outlet header, and including a main steam conduit connected to said outlet header of said superheater.

14. The waste-heat steam generator according to claim 1, wherein said superheater is formed of two part heating surfaces connected in series on the medium side.

15. A once-through waste-heat steam generator, comprising:
   a number of heating surfaces heatable by a flue gas and carrying a medium to be heated, said number of heating surfaces including:
      an evaporator having an inlet side, an outlet side and evaporator tubes;
      a preheater following said evaporator on a flue gas side; and
      a superheater preceding said evaporator on the flue gas side, said evaporator, said preheater and said superheater disposed on a medium side in countercurrent to a flue gas flow;
   an inlet distributor connecting said evaporator on said inlet side to said preheater;
   a throttle configuration connecting each of said evaporator tubes to said inlet distributor; and
   a pressure-equalizing header in a form of an equalizing tube connected to said evaporator.

16. A waste-heat steam generator for a combined-cycle power plant, comprising:
   a number of heating surfaces heatable by a flue gas and carrying a medium to be heated, said number of heating surfaces including:
      an evaporator having an inlet side, an outlet side and evaporator tubes;
      a preheater following said evaporator on a flue gas side; and
      a superheater preceding said evaporator on the flue gas side, said evaporator, said preheater and said superheater disposed on a medium side in countercurrent to a flue gas flow;
   an inlet distributor connecting said evaporator on said inlet side to said preheater;
   a throttle configuration connecting each of said evaporator tubes to said inlet distributor; and
   a pressure-equalizing header in a form of an equalizing tube connected to said evaporator.

* * * * *